United States Patent [19]

Ronc et al.

[11] 4,221,259
[45] Sep. 9, 1980

[54] PROCESS FOR STORING CALORIES

[75] Inventors: Michel Ronc, Saint-Priest; Michel Perrut, Serezin du Rhone; Patrick Valentin, Eyzin-Pinet, all of France

[73] Assignee: Elf Union, Paris, France

[21] Appl. No.: 704

[22] Filed: Jan. 3, 1979

[51] Int. Cl.³ ............................................. F28D 21/00
[52] U.S. Cl. .................................... 165/1; 165/104 S; 252/70; 126/430; 126/436
[58] Field of Search ................. 165/104 S; 126/400, 126/436, 430; 252/70

[56] References Cited

U.S. PATENT DOCUMENTS

| 2,846,421 | 8/1958 | Pollock | 165/104 S X |
| 2,989,856 | 6/1961 | Telkes | 252/70 X |
| 3,200,877 | 8/1965 | Lehmer et al. | 165/104 S X |
| 3,720,198 | 3/1973 | Laing et al. | 252/70 X |
| 4,003,426 | 1/1977 | Best et al. | 165/104 S X |

Primary Examiner—Albert W. Davis
Attorney, Agent, or Firm—Burgess, Ryan and Wayne

[57] ABSTRACT

A process for storing heat in the form of fusion/solidification latent heat which comprises passing a thermo-conductive fluid into a thermally insulated storage element containing a substance having a melting point that corresponds to the supply and heat consumption temperatures, characterized in that said fusible substance is absorbed on a microporous carrier which forms a granular bed in which the thermo-conductive fluid circulates.

7 Claims, 1 Drawing Figure

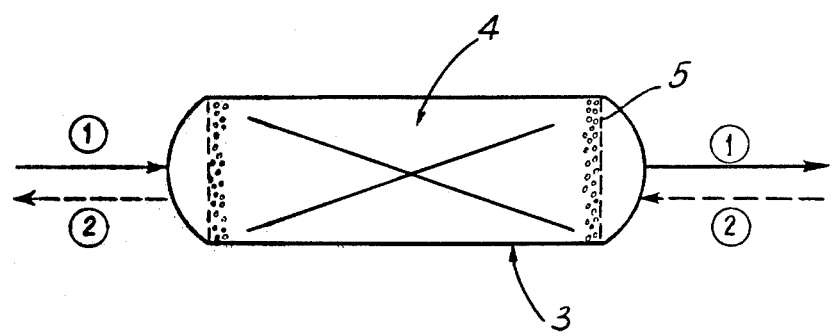

PROCESS FOR STORING CALORIES

BACKGROUND OF THE INVENTION

The object of this invention is a process for storing heat in the form of latent heat which comprises storing the heat originating from a hot fluid by passing said fluid into a thermally insulated storage element. This storage element contains a substance capable of fusion/solidification under the influence of the introduction or abstraction of heat by means of a sweeping fluid.

It is known to store heat produced from different sources of energy in the form either of perceptible heat of a fluid, generally water, or of a solid such as gravel, or in the form of latent heat of phase change of suitable body at the level of temperature used.

The first type of storage requires devices of substantial volume, the heat capacity of the substances used being in the proximity of 0.5 cal.g$^{-1}$.(°C.)$^{-1}$, that of the water reaching the exceptional value of 1 cal.g$^{-1}$.(°C.)$^{-1}$. The temperature level of abstraction of the stored heat is clearly less than that of the introduction of the heat by the source of energy. In the case of solids such as gravel there is a great resistance to thermal transfer between the thermo-conductive fluid and the medium storing the heat which also impairs interest in the process.

However, the storage in the form of latent heat of fusion makes it possible to store much more heat per unit of volume of storage and to minimize the loss of temperature level between the stored heat and the abstracted heat. Storage in the form of latent heat of fusion has been extensively studied for a very broad temperature range, making use of different substances, mainly fusible salts, paraffins, polymers and metal alloys.

However, practical application of the storage of heat in the form of latent heat is difficult. If a receptacle traversed by a coil through which the thermo-conductive fluid circulates is filled with a substance susceptible to melting or solidifying at a temperature compatible with the introduction and abstraction of heat required, the flow of heat on the walls of the coil would be very small during the solidification phase when heat is being withdrawn. The transfer of heat takes place only by conduction through an increasing thickness of solid. In the fusion phase corresponding to heat storage, the transfer of heat takes place only by natural conduction and convection. The process is not efficient due to the generally high viscosity of substances in the proximity of their solidification point.

In order to reduce said inconveniences and increase to the maximum the thermal flow between the medium storing the heat and the thermo-conductive fluid, it is necessary to increase the exchange surface and reduce the thickness of the storing medium.

Different solutions have been proposed. One of the best solutions is to encapsulate the fusible substance in the form of a granular medium: balls or spheroids in general. However, unless the capsules are of small diameter, which poses a problem of microencapsulation, and use at relatively low temperatures - since the substances that are used for encapsulation are generally polymers - the solution is of no great interest.

BRIEF DESCRIPTION OF THE INVENTION

In the process of this invention, the fusible substance is absorbed on a microporous carrier in the form of finely divided powder, grains or small sticks. The carrier constitutes a granular bed in which the liquid or gaseous thermo-conductive fluid circulates.

The heat storing medium is of small size and therefore provides a large contact surface. Since the grains have a maximum diameter of only 1 or 2 mm, the thickness of the solid in which conduction of heat takes place is very small. The coefficient of thermal transfer thus is very high permitting a rapid transfer of heat between the thermo-conductive fluid and the porous medium in which the solidification or fusion of the heat storing substance takes place. On the other hand, the flow of the thermo-conductive fluid within the granular bed can be very close to slug flow with little backmixing in view of the size of grains used. This facilitates the use of storage cycles and heat removal from storage; with a high yield and a minimum loss of thermal level.

DETAILED DESCRIPTION OF THE INVENTION

The porous carrier is selected for its capacity of absorption of the fusible substance and the stability of the absorption in the presence of the thermo-conductive fluid. It is required to select a porous carrier which is more wettable by the fusible substance than by the thermo-conductive fluid when said fluid is a liquid. If the porous carrier is not preferentially wetted by the fusible substance, displacement of the fusible substance in the pores of the porous medium occurs and it is driven out of the carrier by the thermo-conductive fluid.

The grain size is chosen by optimizing different criteria associated with the loss of charge, with thermal flow, with the size and with the cost of the accumulator.

Storage is effected by circulating the thermo-conductive fluid through the porous bed in the direction 1 shown in FIG. 1. Heat withdrawal is effected by circulating the thermo-conductive fluid either in direction 1 or in direction 2.

In this figure, 3 represents the insulated thermal storage receptacle, 4 the granular bed, 5 the racks or support plates and distributors.

Special care is taken to obtain a good dispersion of the thermo-conductive fluid in the granular bed to avoid the bypassing according to the practices commonly observed in chemical engineering.

The present invention is particularly useful in that heat may be introduced or withdrawn from storage without a large variation in temperature.

By way of non-limiting illustration the following example can be cited:

EXAMPLE 1

The fusible substance is paraffin with a melting point in the range of 50° C. It is selected for being compatible with the storage of collected solar energy for purposes of household heating, hot-water heating, and hot-air heating for which the problems of storage are specially difficult to solve.

The porous medium is active coal or coke in grains or sticks. It is easy to fill the pores with the paraffin by immersion of the solid in the paraffin at an elevated temperature. Temperatures of about 150° are suitable. The active coal absorbed 0.9 g of paraffin per gram of active coal.

The storage capacity in the form of latent heat is approximately 16-15 KWh/m$^3$. If a considerable difference of temperature is used between storing heat and removing heat from storage, the perceptible heat of the thermo-conductive porous medium-parraffin-fluid combination must be considered. The perceptible heat of water is about 0.75 KWh/m$^3$ per Celsius degree of variation and 0.25 KWh/m$^3$ per Celsius degree of variation if the thermo-conductive fluid is air.

This type of storage can likewise be used at much higher temperatures with fused salts impregnating a porous material or at very low temperatures for cold storage.

What is claimed is:

1. A process for storing heat in the form of latent heat of fusion/solidification which comprises passing a thermo-conductive fluid into a thermally insulated storage receptacle containing a substance having a melting point corresponding to the temperatures of introduction and withdrawal of heat, wherein the fusible substance is absorbed on a finely divided microporous carrier which comprises a granular bed in which the thermo-conductive fluid circulates.

2. A process according to claim 1, characterized in that the finely divided microporous absorbent carrier is in the form of powder, grain or, sticks having a diameter of less than 2 mm.

3. A process according to claims 1 or 2, wherein the absorbent carrier is a material selected from the group consisting of active coal, coke and mixtures thereof.

4. A process according to claim 1, wherein the fusible substance is selected from the group consisting of paraffin, fusible mineral salts, metal hydrides, alloys, metal alloys and polymers.

5. A process according to claim 1 or 2 or 4, wherein the microporous carrier is impregnated by immersion in the melted fusible substance.

6. A process according to claim 1 or 2 or 4, wherein the fusible substance preferentially wets the carrier to an extent greater than the thermo-conductive fluid whereby displacement of fusible material from the carrier material is prevented.

7. A process according to claim 1 or 2 or 4, wherein the thermo-conductive fluid is air.

* * * * *